United States Patent
Pampus et al.

(10) Patent No.: US 8,710,975 B2
(45) Date of Patent: Apr. 29, 2014

(54) METHOD FOR INDICATING THE PROCESS OF LEAVING A PARKING SPACE

(75) Inventors: Christian Pampus, Leonberg (DE); Florian Raisch, Gaertringen (DE); Albrecht Irion, Stuttgart (DE); Marcus Schneider, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 726 days.

(21) Appl. No.: 12/927,794

(22) Filed: Nov. 23, 2010

(65) Prior Publication Data

US 2011/0128140 A1      Jun. 2, 2011

(30) Foreign Application Priority Data

Nov. 30, 2009  (DE) .......................... 10 2009 047 262

(51) Int. Cl.
*B60Q 1/34*      (2006.01)
(52) U.S. Cl.
USPC ........ 340/465; 340/461; 340/468; 340/932.2; 701/41; 701/301; 180/204
(58) Field of Classification Search
USPC ................. 340/465, 458, 461, 468, 471, 478, 340/932.2, 436; 701/41, 42, 300, 301; 180/199, 204, 412
See application file for complete search history.

(56) References Cited

U.S. PATENT DOCUMENTS

| | | | |
|---|---|---|---|
| 2,029,130 A | | 1/1936 | Schwartz |
| 6,154,695 A | * | 11/2000 | Shimizu et al. ................. 701/41 |
| 6,275,754 B1 | * | 8/2001 | Shimizu et al. ................. 701/41 |
| 7,640,108 B2 | * | 12/2009 | Shimizu et al. ............... 701/301 |
| 2004/0130464 A1 | * | 7/2004 | Schindler et al. .......... 340/932.2 |
| 2009/0259365 A1 | * | 10/2009 | Rohlfs et al. .................... 701/41 |
| 2010/0039292 A1 | * | 2/2010 | Scherl et al. ............... 340/932.2 |
| 2011/0054739 A1 | * | 3/2011 | Bammert et al. ............... 701/41 |

FOREIGN PATENT DOCUMENTS

| | | |
|---|---|---|
| DE | 100 45 616 | 3/2002 |
| DE | 103 55 807 | 7/2004 |
| DE | 103 06 108 | 9/2004 |
| DE | 10 2005 061 909 | 7/2007 |
| DE | 10 2007 029 773 | 12/2008 |
| DE | 10 2008 017 030 | 10/2009 |
| EP | 1 935 739 | 6/2008 |
| EP | 2 000 356 | 12/2008 |
| FR | 2 913 381 | 9/2008 |
| JP | 2006-264126 | 10/2006 |
| JP | 2009-52554 | 3/2009 |
| WO | WO 2005/058641 | 6/2005 |

* cited by examiner

*Primary Examiner* — Hung T. Nguyen
(74) *Attorney, Agent, or Firm* — Kenyon & Kenyon LLP

(57) ABSTRACT

In an automated method for providing an indication, with the aid of a turn signal indicator, that a vehicle is leaving a parking space, a vehicle control system detects initially whether an executed driving maneuver is a maneuver related to leaving a parking space, in which case the maneuvering out of a parking space is indicated by activating the turn signal indicator, and the turn signal indicator is kept activated until the process of maneuvering out of the parking space has been concluded.

7 Claims, No Drawings

METHOD FOR INDICATING THE PROCESS OF LEAVING A PARKING SPACE

BACKGROUND OF THE INVENTION

1. Field of the Invention

The present invention relates to an automated method for indicating, with the aid of a turn signal indicator, that a vehicle is in the process of leaving a parking space.

2. Description of the Related Art

These days, parking assistance systems are frequently used to assist the driver of a vehicle in pulling into or out of a parking space. In general, these systems are equipped with distance sensors, with whose aid the distance to objects in the vehicle environment is determined in order to warn the driver of potential collisions. Information about the distance to an object is output to the driver. Optical and/or acoustic displays, for instance, are used for this purpose. For example, it is common to output sequences of warning sounds, the repeat rate of the warning sounds increasing as the distance to an object decreases. In the event of an immediate collision risk, i.e., when dropping below a specific distance, a continuous sound is output. In addition, the distance to objects is frequently displayed optically. This is done with the aid of LEDs, for instance, the number of the lit LEDs increasing with decreasing distance to an object. In addition, the color of the LEDs may also change when dropping below a predefined distance. As an alternative, there are also systems in which a two-dimensional display of the vehicle is shown on a suitable display device in a plan view, and objects in the vehicle environment are indicated. A screen of an onboard computer, for instance, or also a screen of a navigation system of the vehicle is used as display device.

In addition to parking assistance systems, which inform the driver only about the distance to objects in the vehicle environment, there are also parking assistance systems that provide information regarding the steering, or which automatically maneuver the vehicle into and out of a parking space. In this case, the steering of the vehicle is under the control of the particular parking assistance system. The driver generally needs to take care only of the forward and backward movements of the vehicle. Apart from systems in which the parking assistance system assumes the steering, systems are also available which provide the driver with information about the required steering positions for pulling the vehicle into or out of a parking space. To be able to offer the driver corresponding assistance, the parking space is measured prior to pulling into it, and a suitable parking trajectory into the parking space is calculated. When pulling out of the parking space, either the previously stored data of the parking space are utilized, or else a new measurement of the parking space is undertaken while the vehicle is standing and a trajectory for moving out of the parking space is calculated subsequently. The trajectories for pulling out of or into a parking space are determined in such a way that the vehicle is able to be maneuvered into and out of the parking space with the least number of maneuvering movements.

In order not to pose any danger to moving traffic and at the same time to indicate the intention of pulling out of a parking space, at the beginning of the parking maneuver a turn signal indicator should indicate the intention of leaving the parking space in the pull-out direction. However, because of the automatic release of the turn signal indicator when the steering wheel is returned to the neutral position, the turn signal indicator is frequently deactivated automatically in the course of maneuvering, and the display to the moving traffic stops. If the driver fails to notice that the turn signal indicator has been deactivated, this could lead to an accident, especially because the driver of the vehicle will assume that other traffic participants are aware of his intention and the driver slips into the moving traffic without further signaling. The danger of an accident as a result of this is particularly high in very confusing situations, such as at night, when it is raining, or during cornering.

Furthermore, there is also the risk, especially when an automatic parking assistance system is used which assumes control when pulling out of a parking space, that the driver forgets to activate the turn signal indicator.

BRIEF SUMMARY OF THE INVENTION

An automated method according to the present invention for indicating, with the aid of a turn signal indicator, that a vehicle is in the process of pulling out of a parking space includes the following steps:

a) determining whether an executed driving maneuver constitutes maneuvering out of a parking space, b) indicating the process of leaving a parking space by activating the turn signal indicator, and c) actively keeping the turn signal indicator activated until the process of leaving a parking space has been concluded.

By keeping the turn signal indicator, generally known as blinker, active until the process of leaving a parking space has been concluded, the moving traffic is kept informed of the vehicle driver's intentions at all times. The moving traffic is therefore able to prepare for this process of leaving a parking space and, if necessary, may brake in time, so that collisions are avoided.

DETAILED DESCRIPTION OF THE INVENTION

In order to be able to keep the turn signal indicator activated for the duration of the pull-out maneuver, the switch of the turn signal indicator must be decoupled from the normally utilized actuating device. This makes it possible to activate the turn signal indicator via the actuating element in regular traffic and to deactivate it again when the steering wheel is brought back into the original position; in contrast, no deactivation of the turn signal indicator takes place when maneuvering that is related to leaving a parking space is detected. Two different options are available in this regard; when maneuvering is detected in connection with leaving a parking space, the actuating element for the turn signal indicator is not brought into its initial position or, alternatively, the actuating element is brought into its initial position, but the switch for the turn signal indicator is not activated in such a case.

The actuating element for the turn signal indicator frequently is a lever, which is situated in the vicinity of the steering wheel, so that it is able to be operated without the driver having to take his hands off the steering wheel. However, other switches or actuating devices by which the turn signal indicator is activatable are conceivable as well. Nevertheless, these should then likewise be disposed such that the driver will not be forced to let go of the steering wheel in order to activate the turn signal indicator.

To ensure that the turn signal indicator is not deactivated when the steering wheel is returned to its neutral position, it is advantageous to trigger the turn signal indicator with the aid of a control device. The control device may be connected to the driver assistance system, for instance, so that instructions by the driver assistance system are able to be transmitted to the turn signal indicator via the control device.

If the vehicle is equipped with a driver-assistance system that also allows pulling out of a parking space automatically, it is furthermore advantageous if the turn signal indicator is actuated automatically as soon as the driver-assistance system is activated for an automatic maneuver in connection with leaving a parking space. For example, the activation of the driver-assistance system may take place via the actuation of a suitable operating element, such as a switch or a touch-sensitive screen.

As an alternative, the driver-assistance system may also be activated for leaving a parking space by actuating the turn signal indicator. According to the present invention, when the steering wheel is moved back to the neutral position in such a case, the turn signal indicator will not be deactivated automatically but remain activated until the process of leaving the parking space has been concluded.

The deactivation of the turn signal indicator may be implemented automatically or manually once the maneuver for pulling of out the parking space has been concluded. If the turn signal indicator is deactivated manually, then the driver actuates a corresponding actuating element in order to deactivate the turn signal indicator. If the turn signal indicator is deactivated automatically, the employed driver-assistance system detects whether the pull-out parking maneuver has been completed, and if the conclusion of the pull-out operation is determined, then the turn signal indicator is deactivated. The conclusion of the pull-out parking operation may be, for example, the acceleration of the vehicle to a speed that exceeds a predefined speed. As an alternative, it is also possible, for example, to detect the conclusion of the process of leaving a parking space when the vehicle drives in the same direction for a certain distance that exceeds a predefined driving distance, e.g., one vehicle length. The driving direction of the corresponding stretch is usually a forward direction.

To ensure that the turn signal indicator remains activated only in a pull-out maneuver and not during a normal driving maneuver such as a turn-off operation, the executed driving maneuver must be detected as maneuvering for the purpose of leaving a parking space. In one first specific embodiment, the driving maneuver is recorded as pull-out maneuver upon the activation of an automatic system for pulling out of a parking space. Since such an automatic parking system is usually activated only when a parking space is meant to be left, it may be assumed in every instance that the activation of the automatic system for leaving a parking space will actually also be followed by a pull-out operation. The activation of the automatic system for leaving a parking space, which usually is part of a driver-assistance system, may be implemented as previously described, by actuating a suitable actuating element, for instance. Usable actuating elements for this purpose are appropriate switches, push-button switches, or also a touch-sensitive screen. As an alternative, it is also possible to activate an automatic system for leaving a parking space by activating a flashing light while the vehicle is at a standstill. To ensure that this constitutes a case of leaving a parking space, it is possible, for example, to activate the automatic parking system by setting the flashing indicator only when additional prerequisites are satisfied.

For example, the distance to objects in the environment of the vehicle may be recorded as additional prerequisite. If objects do not move when the vehicle is moving, it may be assumed that maneuvering for the purpose of pulling out of a parking space is desired. Especially when a turn-off operation is intended and another vehicle is standing in front of the vehicle, this vehicle will move first before the driver begins to move his own vehicle. Because of the fact that the preceding vehicle is already moving before the own vehicle begins to drive, it is initially determined that a moving rather than a stationary object is involved. In such a case it may generally be assumed that the vehicle is not parked.

In one alternative example embodiment, the executed driving maneuver is detected as pull-out maneuver when the distance sensors detect objects in front of and/or behind the vehicle. To ensure that it is indeed a maneuver related to leaving a parking space, in such a case it is likewise advantageous to record in addition whether the objects detected by the distance sensors are detected as stationary objects. If they are stationary objects, a maneuver for the purpose of leaving a parking space usually takes place. If the objects detected by the distance sensors are not stationary objects, it may generally be assumed that the scheduled driving maneuver is not related to leaving a parking space.

Even if a scheduled driving maneuver is detected as leaving a parking space due to the fact that the turn signal indicator is actuated and objects are situated in front of and behind the vehicle, this generally does not pose a problem since the subsequent driving maneuver, such as a turn-off operation, leads to a deactivation of the turn signal indicator even if that driving maneuver had been a maneuver for the purpose of leaving a parking space. Only if the deactivation of the turn signal indicator is carried out by the driver will the deactivation by the driver be necessary in this case in a driving maneuver that was mistakenly detected as leaving a parking space.

Various systems which allow the detection of objects may be employed for detecting objects in the environment of the vehicle. These systems usually include distance sensors and at least one evaluation unit. Ultrasonic sensors, infrared sensors, radar sensors, capacitive sensors or LIDAR sensors are generally used as distance sensors. As a rule, the distance sensors emit a signal that is reflected by an object in the vehicle environment. The reflected echo of the signal is received again by the sensor. The distance of the sensor to the object may then be determined from the propagation time of the signal from its emission to the echo reception. Furthermore, when using a plurality of sensors, the direction of the object may be determined by a rotation and angulation method or by a trilateration method. The signals from the distance sensors are then evaluated in the evaluation unit. In addition to a separate control device which is connected to the distance sensors, a processor in at least one of the distance sensors may alternatively serve as evaluation unit as well.

With currently used driver-assistance systems, the distance sensors are usually disposed in the front region and the rear region of the vehicle. In driver-assistance systems that allow automatic pulling in or pulling out of parking spaces, at least one sensor additionally is positioned such that the environment along the sides of the vehicle is able to be detected.

If a driving maneuver is detected as maneuvering out of a parking space in that objects in front of and/or behind the vehicle are recorded by distance sensors, it is especially advantageous if additional prerequisites are satisfied. For this purpose, for example, it is possible to detect, in addition to recording objects in front of and/or behind the vehicle, a steering operation that leads to driving around at least one of the detected objects. When the vehicle is meant to execute a turn-off operation, this usually does not include navigating around an object. Driving around an object is generally required only when the vehicle is pulling out of a parking space.

In one further example embodiment, a driving maneuver is detected as leaving a parking space when a first driving movement in a first direction is followed by a second driving movement in a second direction opposite the first direction, and when a steering movement takes place during at least one maneuver. If a first move in a first direction is followed by a second move in a second direction that is opposite the first direction, then this will normally point to a maneuvering operation. Such maneuvering operations usually take place when a narrow parking space is to be left. When moving forward in order to slip into moving traffic, this will generally be preceded by a backward move. In this case, the first move in the first direction is a backward move, and the second move in the second direction is a forward move. The backward move increases the distance to an object in front of the vehicle, so that more room is available for maneuvering the vehicle out of the parking space and for slipping into the moving traffic in the forward direction.

Apart from alternatively detecting a driving maneuver as a maneuver for leaving a parking space based on the activation of an automatic system for leaving a parking space, by the detection of objects in front of and/or behind the vehicle, or based on a driving maneuver that was carried out in that an initial first move in a first direction was followed by a second move in a second direction opposite the first direction, it is also possible, however, to detect a driving maneuver as leaving a parking space when at least two of these requirements are satisfied. For example, it may be necessary to activate both an automatic system for leaving a parking space and to detect objects in front of and/or behind the vehicle in addition in order to determine that a driving maneuver is related to the process of leaving a parking space. Moreover, it may also be possible, for example, to detect a driving maneuver as leaving a parking space only when objects are detected in front of and/or behind the vehicle and when a first move in a first direction occurs in addition, which is then followed by a second move in a second direction opposite the first direction. There is also the possibility of detecting a driving maneuver as leaving a parking space only if all three of the afore-described prerequisites are satisfied.

In one additional example development of the present invention, a driving maneuver is detected as leaving a parking space only if the driver has additionally activated the turn signal indicator. For example, it may be possible that both the automatic system for leaving a parking space and the turn signal indicator are activated in order to detect the driving maneuver as maneuvering out of a parking space. As an alternative, a driving maneuver is detected as maneuvering out of a parking space when objects are detected in front of and behind the vehicle, for example, and when the turn signal indicator is activated by the driver in addition.

If the driving maneuver is recorded as leaving a parking space when a first move is followed by a second move in a second direction that is opposite the first direction, and when a steering movement takes place during at least one move, it is advantageous, for example, if the driver activates the turn signal indicator in addition. The activation of the turn signal indicator by the driver preferably takes place no later than the start of the forward move.

To prevent that a driving maneuver, which was detected as leaving a parking space, is carried out without activating the turn signal indicator, it is also advantageous if the activation of the turn signal indicator takes place automatically as soon as it is determined that the driving maneuver involves leaving a parking space. This ensures that the moving traffic, or persons in the environment of the vehicle, are informed of the intentions of the vehicle driver in a timely manner, in that the wish to pull out of the parking space is indicated via an activation of the turn signal indicator.

Giving notice of the intended leaving of a parking space is necessary in particular when the vehicle is parked in a parallel parking space. The method according to the present invention is therefore used especially when a driving maneuver is detected as maneuvering out of a parallel parking space.

In an automatic activation of the turn signal indicator, the side on which the turn signal indicator will be activated results from the steering wheel deflection that takes place first, for example. If a maneuver out of a parking space is to take place toward the left side, for instance, and if the first movement is a backward movement, then the driver of the vehicle will turn the steering wheel to the right when backing up, provided no obstacle prevents such a move. Analogously, in the forward move following the backward move, the steering wheel will be turned to the left. If the first move is a forward move, then the steering wheel is immediately turned to the left. When leaving the parallel parking space toward the right, the steering wheel is therefore moved into the opposite direction.

If an automatic parking system renders assistance in maneuvering out of the parking space, then the direction in which the move out of the parking space is to take place is normally already specified upon activation of the automatic parking system. In this way, the turn signal indicator is usually activated in the correct direction.

What is claimed is:

1. An automated method for providing an indication of a vehicle being in the process of leaving a parking space, comprising:
(a) detecting whether an executed driving maneuver of the vehicle is a part of a maneuver to pull out of the parking space;
(b) indicating the maneuver to pull out of the parking space by activating the turn signal indicator; and
(c) automatically maintaining the turn signal indicator activated until the maneuver to pull out of the parking space has been concluded;
wherein a driving maneuver is determined as a maneuver to pull out of the parking space when distance sensors detect at least one object at least one of in front of the vehicle and behind the vehicle;
wherein a driving maneuver is determined as a maneuver to pull out of the parking space if (i) a first vehicle movement in a first direction is followed by a second vehicle movement in a second direction opposite the first direction, and (ii) a steering movement takes place during at least one of the first and second vehicle movements.

2. The method as recited in claim 1, wherein a driving maneuver is determined as a maneuver to pull out of the parking space when an automatic driver-assist system for leaving a parking space is activated.

3. The method as recited in claim 1, wherein the at least one object detected by the distance sensors is detected as at least one stationary object.

4. The method as recited in claim 1, wherein the driving maneuver is determined as a maneuver to pull out of the parking space when a steering operation to navigate around the at least one object is additionally detected.

5. The method as recited in claim 1, wherein the first vehicle movement in the first direction is a backward move, and the second vehicle movement in the second direction is a forward move.

6. The method as recited in claim 1, wherein the driving maneuver is determined as a maneuver to pull out of the parking space if the turn signal indicator is activated by a driver in addition.

7. The method as recited in claim 6, wherein the turn signal indicator is activated at the beginning of a forward move at the latest.

* * * * *